United States Patent [19]

Solomon et al.

[11] Patent Number: 4,877,694

[45] Date of Patent: Oct. 31, 1989

[54] GAS DIFFUSION ELECTRODE

[75] Inventors: Frank Solomon, Great Neck; Yury Genodman, Brooklyn, both of N.Y.; Jaime Irizarry, Kearny, N.J.

[73] Assignee: Eltech Systems Corporation, Boca Raton, Fla.

[21] Appl. No.: 51,551

[22] Filed: May 18, 1987

[51] Int. Cl.$^4$ .................. H01M 4/86; H01M 12/06
[52] U.S. Cl. ........................ 429/27; 429/42; 429/212; 427/115; 252/182.1
[58] Field of Search ............. 429/42, 44, 40, 27, 429/212; 502/416; 204/294, 290 R; 252/510, 511, 182.1; 428/08; 427/115, 221

[56] References Cited

U.S. PATENT DOCUMENTS

| | | | |
|---|---|---|---|
| 3,457,113 | 7/1969 | Deibert | 429/42 X |
| 3,553,022 | 1/1971 | Gregory | 429/42 |
| 3,840,407 | 10/1974 | Yao et al. | 429/42 X |
| 3,956,014 | 5/1976 | Landsman et al. | 429/42 |
| 4,362,790 | 12/1982 | Blanchart | 429/42 |
| 4,421,579 | 12/1983 | Covitch et al. | 156/60 |
| 4,444,852 | 4/1984 | Liu et al. | 429/42 X |
| 4,456,521 | 6/1984 | Solomon et al. | 204/292 |
| 4,469,579 | 9/1984 | Covitch et al. | 204/283 |
| 4,514,474 | 5/1985 | Momyer et al. | 429/27 |
| 4,518,705 | 5/1985 | Solomon et al. | 429/42 X |
| 4,568,441 | 2/1986 | Covitch et al. | 204/283 |
| 4,568,442 | 2/1986 | Goldsmith | 429/42 X |
| 4,581,116 | 4/1986 | Plowman et al. | 204/284 |
| 4,615,954 | 10/1986 | Solomon et al. | 429/27 |
| 4,643,235 | 2/1987 | Schmoede et al. | 429/42 X |
| 4,647,359 | 3/1987 | Lindstrom | 204/294 |
| 4,696,872 | 9/1987 | Blanchart et al. | 429/42 |
| 4,717,595 | 1/1988 | Watanabe et al. | 429/42 X |
| 4,722,773 | 2/1988 | Plowman et al. | 429/42 X |

OTHER PUBLICATIONS

Preliminary Note, Journal of Electroanalytical Chemistry, 160 (1984), 351–357, Gas Diffusion Electrode of High Performance.

*Primary Examiner*—Anthony Skapars
*Attorney, Agent, or Firm*—John J. Freer

[57] ABSTRACT

A gas diffusion electrode is now prepared which offers extended, efficient operation. For this, the electrode matrix may include a hydrophobic layer containing hydrophobic polymer. The electrode has hydrophilic ingredient of particulate carbon bound by hydrophilic, halogenated polymer binder. The particulate carbon used is a catalyzed carbon. The resulting efficient electrode is capable of extended operation. Moreover, on the one hand carbon catalysis can now be done in economical, straightforward manner, while on the other hand the electrode can have a surface overlay of a dimensionally stable, thin non-cellulosic paper. Such paper may be pressed against the underlying component material by a foraminous overlay, e.g., a metal mesh.

49 Claims, No Drawings

GAS DIFFUSION ELECTRODE

BACKGROUND OF THE INVENTION

Porous electrodes containing catalytic particulates have been developed to enhance the commercialization of electrolytic devices such as fuel cells and metal-air batteries. The electrodes can be useful as oxygen cathodes in such batteries and fuel cells. To enhance their commercial potential, efforts have been extended to augment the electrode capability to operate at high current densities coupled with acceptable durability.

Attention has also been paid to the development of efficient and economical electrodes capable of performing in the harsh chemical environments created by acid or alkaline electrolytes. It has been necessary to attempt to maintain a balance for the permeability of the liquid electrolyte and for the gaseous reactant. Progress in electrode development has led to, for example, electrodes capable of sustained performance at current densities substantially above about 400 milliamps per square centimeter, while exhibiting acceptable resistance to electrolyte. However, long operating life with sustained, desirable performance including resistance to electrode flooding while retarding undesirable depletion of catalytic activity is still needed.

SUMMARY OF THE INVENTION

An electrode has now been Prepared which, especially as a gas diffusion electrode, offers efficient operation coupled with prolonged electrode life. Moreover, efficient electrode start up can now be achieved together with highly desirable electrode working potentials at high current density. It is further contemplated in such application, e.g., as an electrode for a metal-air battery, that the usual electrode backing layer may be dispensed with. Additionally, in such application, it is contemplated to prepare an electrode having a backing layer, but where the active layer is free from gas supplying material.

Furthermore there is now provided rapid, economical blending of macrocyclic compound catalyst with particulate catalyst carrier, e.g., particulate carbon to be used in the electrode. Such mixing is achieved without inefficient solvent processing. Moreover, gas diffusion electrodes have now been prepared which have enhanced dimensional stability and resistance to elevated gas pressure An electrode of multi-layer construction is fabricated that not only has such stability but also ease and economy of manufacture. It is also contemplated that the developed technology can be further useful for enhanced catalyst utilization such as in solid polymer electrolyte application.

In a broad aspect, the invention pertains to an electrode of extended performance at high current density, the electrode comprising a gas supplying, gas porous layer containing hydrophobic polymer, and an electrolyte porous active layer comprising catalyst containing carbon particles intimately blended with, and uniformly distributed throughout, hydrophilic, halogenated polymer binder for said catalyzed carbon particles.

In another aspect, the invention is directed to the above-described electrolyte Porous active layer as such electrode without a gas supplying layer. Moreover, where such gas supplying layer is present, the invention is further directed to an active layer which is free from gas supplying material.

In further aspects, the invention is directed to a blended particulate mixture for preparing such electrodes, as well as to methods for preparing both such a mixture or the electrode itself. In another aspect the invention is directed to a gas diffusion electrode of enhanced stability having non-cellulosic paper in pressed engagement with the electrolyte face of the electrode. In yet a still further aspect the invention pertains to the straightforward preparation of catalytically active carbon for use in the electrode.

DESCRIPTION OF THE PREFERRED EMBODIMENTS

The terms "gas diffusion electrode" or "sheet electrode" as they are used herein relate to not only the air or oxygen cathodes as find application in metal-air batteries, such as aluminum air batteries, but also relates to such electrodes as may find use in applications such as for solid polymer electrolyte application and related fuel cell applications. It is therefore meant to be understood that the electrode of the present invention need not be limited to use as an air cathode, i.e., limited to use for oxygen reduction, but can be employed in a variety of reactions including hydrogen oxidation, sulphur dioxide oxidation and organic fuel oxidation.

Moreover, a variety of electrolytes may come into contact with the gas diffusion electrode of the present invention, as represented by acid electrolytes, alkaline electrolytes and saline electrolytes. The electrolytes may be non-aqueous systems, and therefore the electrode may find use in applications such as organic electrolyte batteries. Where the electrode of the present invention may be made up from two layers, there will be used terms herein to describe the one, or hydrophobic layer, such as the "wetproof layer" or "backing layer" or "gas supplying layer." This layer can be made of "hydrophobic ingredient" or "gas supplying material". Then the other, or hydrophilic layer, may often be referred to herein as the "active layer" and the material used in preparing it as the "active material" or "hydrophilic ingredient". Such active material can consist of a mixture of finely-divided catalyzed carbon plus hydrophilic binder, e.g., hydrophilic polymer.

A "dual phase active layer" will contain both active material plus gas supplying material. The gas supplying material for this use, as well as for the gas supplying layer itself, can be composed of uncatalyzed particulate substance, e.g., carbon, plus hydrophobic binder such as hydrophobic polymer.

More specifically in the active layer composition there will be present a catalyzed carbon. The suitable carbons for the catalyzed carbon can include amorphous as well as crystalline carbons. Representative carbon blacks that may be employed as the particulate carbon are the furnace blacks and acetylene blacks. It is contemplated that where active carbons are present, they may be activated in any manner known for preparing such particulate carbon. As used herein, the term "particulate carbon" is meant to include both carbon black as well as activated carbon. In use in preparing the electrode, the particulate carbon will most typically be very finely divided. Suitable materials will usually have particle size on the order of from 5 to 300 nanometers, e.g., activated carbons having size within the range of from about 5 to about 150 nanometers, but with agglomeration, agglomerated particles may reach sizes of 1000 to 10,000 nanometers. A preferred particulate carbon for the active layer is steam activated acetylene black.

In the processing for preparing the active layer, the particulate carbon is combined with catalyst, thereby forming catalyzed carbon. Representative catalysts can include catalysts such as for methanol oxidation as well as electrochemically active substances. The electrochemically active substances may be platinum group metals or platinum group metal oxides, as well as other metal oxides. Where the electrode will be used in solid polymer electrolyte application, the utilization of a platinum group metal catalyst as metal or oxide or both can be especially serviceable. Suitable catalyst can also be prepared during heating of macrocyclic compound substances. The term "macrocyclic compound" catalyst is used herein for convenience, although it will be understood that it is the residue remaining upon heating such compound, e.g., at an elevated temperature of at least about 400° C., that provides the catalytic activity. For the platinum group metal catalysts, one or more of ruthenium, palladium, rhodium, platinum, and iridium may be employed. For the platinum group metal oxides there can be used any of those known for their electrochemical activity. For the other metal oxide catalysts, such can include magnetites, ferrites, spinels, e.g., cobalt spinel, perovskites and the like. Mixed metal oxide coatings such as a solid solution of a film-forming metal oxide and a platinum group metal oxide may also be serviceable. For the macrocyclic compound group, these can include tetramethoxyphenyl porphyrin complexes, e.g., the cobalt complex (CoTMPP), cobalt and iron phthalocyanine, tetracarboxylated iron phthalocyanine complex, tetra-aza annulene complexes and tetraphenylporphyrin complexes, such as of cobalt and iron.

Preferably, for most efficient operation, the catalyzed carbon for a gas diffusion electrode used in a metal-air battery application contains CoTMPP residue as catalyst. That is, the CoTMPP compound is blended with the carbon and by heating to leave a residue, the catalyzed carbon is prepared. Usually the heating will be at an elevated temperature within the range from about 500° C. to about 900° C. Such heating will be in an inert atmosphere, e.g., argon or nitrogen, and for a time few hours, with about two hours being sufficient. Although the cobalt complex is preferred, it is to be understood that other metals may be employed, including iron, nickel, copper, vanadium, chromium, ruthenium, rhodium, palladium and silver, as well as combinations thereof.

Although conventional solvent methods may be employed for combining macrocyclic compound catalyst with the particulate carbon, it is a particular feature of the present invention that such combination be provided by direct mixing or wet milling procedure. For direct dry blending, such may be initiated by any blending operation useful for combining Particulate, free-flowing solids. Suitable equipment for such blending can include cone blenders, V-blenders, ribbon blenders and the like. It is advantageous for a most intimate blending of catalyst and carbon that after an initial moderate blending operation, such blend be then subjected to a vigorous milling operation or the like, e.g., ultrasonic agitation. There usually results from such operation a mixed, dry particulate having particles more finely-divided then about 20 microns. Serviceable milling apparatus for this more vigorous blending include hammer mills and ball mills.

As an alternative to direct dry blending, the macrocyclic compound may also be wet blended with the Particulate carbon. As in the above described dry blending operation, this wet method is similarly free from dissolution of the macrocyclic compound in blending medium. For this operation, crystalline macrocyclic compound can be dispersed in suitable wet milling liquid medium, usually an organic liquid medium such as isopropyl alcohol, with the milling generally proceeding at a low temperature, e.g., a temperature of about room temperature or above, but not exceeding the boiling point of liquid medium. The particulate carbon can be added while the dispersion is agitated. As an alternative, the blended solids may be sprayed with organic liquid during blending to provide the wet milling mixing operation For use in the wet milling operation, suitable equipment includes ball mills and colloid mills. The resulting mixture from the wet milling will then be typically filtered and dried and any remaining liquid medium can be volatilized from the resulting filter cake during the subsequent heating step for preparing the catalyst from the macrocyclic compound.

In the continuation of the preparation of the active material, the catalyzed carbon is blended with hydrophilic halogenated polymer. In the blend, the particulate, catalyzed carbon will usually provide from about 35 to about 90 weight percent of the blend. Less than about 35 weight percent may provide insufficient reaction sites in the active layer as finally prepared. On the other hand, greater than about 90 weight percent of particulate carbon may lead to insufficient Presence of polymer binder and thus deleterious tensile strength of the resulting active layer. Usually, the particulate, catalyzed carbon will be present in the blend in an amount sufficient to provide the active material with such catalyzed carbon in an amount from about 60 to about 80 weight percent As mentioned hereinabove, the blend for preparing the active material contains catalyzed carbon present with hydrophilic halogenated polymer. Generally, all of the polymer for the active material will be hydrophilic halogenated polymer, although it is contemplated that such polymer other than halogenated polymer can be included. For the halogenated polymer, chlorinated and fluorinated polymer, or those which are both may be used. Advantageously for efficiency, the polymer will be a halogenated fluorinated polymer. In selecting polymer to be used, it is preferred if it can be solubilized, as will be more particularly discussed hereinbelow. Also, the polymer selected should be stable in the environment in which the electrode is used, for example in an aluminum-air battery the polymer should be stable in strongly alkaline solutions at temperatures well above ambient, e.g., up to 80° C. or more.

Typically, there will be present in the active material layer from about 10 weight percent up to about 65 weight percent of the hydrophilic polymer, basis weight of polymer plus particulate catalyzed carbon. Use of less than about 10 weight percent of the polymer will not provide sufficient tensile strength for the electrode in use. On the other hand, greater than about 65 weight Percent of the polymer can deleteriously affect the activity of the electrode. Usually there will be present from about 10 to about 40 weight percent of the polymer, basis total particulate catalyzed carbon and polymer weight As mentioned hereinbefore, preferred hydrophilic polymers are those which can be solubilized, in whole, or in part, for best blending with the catalyzed carbon, although it is contemplated that serviceable polymers may essentially be only well dispersed in liquid medium The resulting solution, or in some instances a mixture more nearly approximating a dispersion, can then be mixed with the catalyzed carbon. Whether the polymer is totally or partly solvated, or present as essentially a dispersion, for convenience herein such may be referred to as a "solution" of the polymer, or reference may merely be made to the polymer having been "established" or "prepared" or the like in a solvent medium for same. Preferred fluorinated polymers as the hydrophilic polymers have functional groups on the fluorocarbon chain which are pendant to the main polymer backbone. These polymers may be prepared from at least two monomers that include fluorine substituents. One of the monomers can be represented by tetrafluoroethylene and the other by substances such as fluorocarbon vinyl ethers having an acid or acid precursor group. The polymers may have functional groups including pendant sulfonyl, carboxyl or, in some cases, phosphonic acid groups. Additionally, esters, amides or salts based upon the functional groups, may be useful, e.g., the lithium salt form of the sulfonyl group. Where the blend of catalyzed carbon plus polymer may be used in a solid polymer electrolyte application, it will be useful to employ the polymer as the ionizable hydrogen form. Representative hydrophilic fluorocarbon polymers which may be termed herein "fluorinated ionomers", can be represented by those containing sulfonate groups, and these can be referred to for convenience herein as perfluorosulfonate ionomers (PFSI's).

Although hydrophilic fluorinated polymers are preferred, solutions which are especially preferred for economy have at least a major amount of PFSI. Typically those solutions consisting solely of PFSI have on the order of 5 to 10 weight percent of such polymer. In general, the polymer solutions may be prepared in a solvent of polar organic compounds or low boiling alcohols. A composition of especial interest for economy, is the lithium salt form of PFSI solubilized in sulfolane. In solution, the hydrophilic polymer can be mixed with the catalyzed carbon by any suitable means for combining a particulate solid with a solution, e.g., merely adding the catalyzed carbon to the polymer solution accompanied by vigorous agitation. Following the blending, the resulting dispersion can be dried to a damp material, usually having a consistency initially of a mud, and then finally to a more form stable, dry product, usually all at a moderate temperature and pressure, if pressure above normal pressure is employed.

It will then most always be desirable to communicate the resulting dry product A coarse grinding or chopping action is serviceable for at first preparing coarse particulates. These coarse particulates may then be processed by any method for preparing a very finely divided product, e.g., vigorous milling. The milling should proceed for a time sufficient to provide a product having a particle size finer than about 40 microns Usually, such particles will not be more finely divided than about one micron, with all particles typically being within the size range of from about one micron to about 25 microns. Individual particles can be expected to have catalyzed carbon particles bound with the hydrophilic polymer.

Where the sheet electrode will serve as a gas diffusion electrode, another component that may be present in the active layer is the hydrophobic ingredient. This ingredient can be in particulate form and processed right along with the active material. In this processing, there can be mixed together particles of active material along with particulate hydrophobic ingredient. When the active layer comprises active material plus hydrophobic ingredient, it will be possible to prepare a serviceable gas diffusion electrode without a backing layer. Also, where a backing layer is used, the active layer may or may not contain hydrophobic ingredient. This hydrophobic ingredient whether Present as a separate backing layer or as an active layer component with the active material, usually comprises a mixture of particulate substance, e.g., particulate carbon such as uncatalyzed carbon, with hydrophobic polymer. It will sometimes however be suitable to employ just the hydrophobic polymer, e.g., when added to the active material for preparing the active layer, or when Preparing the backing layer itself. The particulate carbons which may be employed where the polymer plus particulate carbon are used, are most always those which are typically poorly catalytic and usually more crystalline. Graphite may also serve as a suitable particulate carbon in the hydrophobic ingredient.

When particulate, uncatalyzed carbon is used with hydrophobic polymer, it will usually be very finely divided, having all particles finer than about 0.3 micron with the useful carbons usually having particles sized within the range from about 5 to about 200 nanometers. In use, the particulate carbon can be expected to contain agglomerates composed of these most finely-divided particles. Advantageously, for economy, the suitable particulate carbons will include acetylene black and similar low surface carbon blacks having an average Particle size of on the order of about 50 nanometers.

For the hydrophobic polymer, contributing to this polymer there can be one or more of polymers such as various vinyl resins, as well as polyethylene and polypropylene type hydrocarbon polymers of molecular weight approaching 1,000,000 or even more. Most always the useful polymer will be a halocarbon polymer including the fluoropolymers. Particularly useful fluoropolymers are polytetrafluoroethylene (PTFE), polychlorofluoroethylene and ethylene-propylene copolymer (FEP). Mixtures of these resins are also serviceable.

Typically, the particulate, uncatalyzed carbon or the like will be blended with finely-divided dry hydrophobic polymer or with a liquid dispersion of the polymer. If a dispersion is used, subsequent heating is employed to prepare a dry blend, as well as remove wetting agents that can be incorporated in the dispersion. Most always for such blend the polymer will contribute from about 20 to about 60 weight percent of the blend, basis polymer plus particulate. Less than about 20 weight percent can provide insufficient polymer for desirably binding all particles, e.g., uncatalyzed carbon particles, while greater than about 60 weight percent of polymer can lead to low gas porosity for a material such as a backing layer made from the blend.

After mixing, the blend can then be heat treated to bind the carbon and/or similar particulates of the blend with the polymer. Usually, sufficient heat is applied to melt and diffuse the polymer. For example, with a blend of PTFE and FEP heating at a temperature of about 250°–350° C. and for a time of approximately 1 to 4 hours will usually be sufficient. Upon cooling, the resulting heat treated blend can be comminuted, such as by milling, to form finely-divided particles of the particulate substance bound with hydrophobic polymer, with all such finely-divided particles usually being within the size range of from about one micron to about 50 microns.

Where a gas supplying layer will be prepared from this resulting particulate blend, or will be prepared from particles of hydrophobic polymer itself, or be prepared from a mixture of these materials, the blend or the polymer itself or the mixture may first be dispersed in a liquid medium. Such a medium will usually be a low boiling organic liquid medium, as from an alcohol such as isopropanol or from a blend of alcohols. The particles can be vigorously mixed into the medium by any suitable means for blending a solid particulate into a liquid to form a uniform dispersion. Where such dispersion technique is employed for forming the gas supplying layer, the dispersion medium can then be filtered onto a separable substrate, e.g., an asbestos paper or similar filter paper. After formation of a freshly deposited damp layer on the separable filter substrate, the damp layer will generally be dried as by a heat treatment to volatilize dispersion liquid medium by heating at a moderate temperature of about the boiling point, or above, for the liquid medium, e.g., on the order of 100° C., while under moderate pressure, such as 100–500 psi. Continuing drying, but at elevated pressure, is usually sufficient for providing the gas supplying layer.

For preparing an active layer, such as from active material but more usually from a blend of active material plus gas supplying material, the layer formation can be initiated in similar manner. That is, particulate ingredients may be uniformly dispersed in liquid medium, e.g., an alcohol medium. Where both active material and gas supplying material are present, this blending will combine at least from about 1.5 weight parts of the active material with about one weight part of the gas supplying material. Less than about 1.5 weight parts can be insufficient for desirable catalysis at efficient reaction rates. Since the gas supplying material can be diminished to the point of elimination in the active material, all proportions greater than 1.5 to 1 are contemplated. The uniform dispersion of particulates in liquid medium can then be filtered to provide the initial, wet active layer. Where the above-described gas supplying layer will be used in sheet electrode preparation, such layer may serve as the "filter paper". By this means, the dispersion medium of active ingredient then is passed through the gas supplying layer leaving the active layer in intimate deposition thereon. As in the formation of the gas supplying layer, the damp, freshly deposited active layer can then be dried, e.g., at a moderate temperature usually at, or slightly above the boiling point of the dispersion liquid medium, while under a moderate, mechanical pressure, such as approximately 100–500 psi, although a very elevated Pressure, e.g., on the order of 2000–3000 psi or so may be employed. The resulting dried layer will then be sintered, under pressure. Typically, again only a moderate pressure, of on the order of approximately 100 to 500 psi will be employed, although a more elevated pressure of 1000 psi or a very elevated pressure of usually not in excess of 3000 psi can be used. This sintering is conducted at a temperature sufficiently low enough so as not to endanger any deleterious polymer decomposition. Generally sintering temperatures will not exceed above about 350° C. Where sulfonic acid groups are present in the hydrophilic fluorinated polymer and these groups are to be preserved during heating, the heating will not exceed about 280° C. Heating times of on the order of about a few minutes, e.g., 5 to 10 minutes, to not more than about one-half hour are sufficient, although a duration of heating of 1 to 2 hours or more may be used.

For preparing a more rugged, self-sustaining electrode, there may be used on broad planar faces of the sheet electrode a foraminous overlay, e.g., a mesh structure. Such can be a screen of woven wire cloth or expanded metal or fiber metal having an extensive open area, although materials other than metal meshes may be used. The extensive open area permits ready access through the foraminous overlay of air or electrolyte to the underlying sheet electrode. Regardless of specific construction, the preferred structure will usually be referred to herein as simply the "mesh." The material of the mesh may be electrically conductive and, particularly when in contact with electrolyte, is most always corrosion resistant, i.e., resistant to corrosion by the electrolyte, including caustic battery electrolyte. By being electrically conductive, a grid on the face of the hydrophilic layer face of a gas diffusion electrode can serve as a cathode current collector.

Where metal meshes are used, the metal of the mesh may typically be nickel, lead, tantalum, gold, silver, or silver plated nickel, or silver plated copper, possibly with a strike such as a nickel strike. Other materials that may be used for the mesh include corrosion resistant plastics if electrical conductivity is not needed, as well as valve metals for acid electrolytes. Differing meshes can be used on each side of an electrode, e.g., on both the gas face as well as the electrolyte face of a gas diffusion electrode. For example, an expanded nickel mesh can be used on the electrolyte face and a nickel woven metal cloth grid can be used on the gas face. For the woven wire meshes, these will typically be comprised of wires that are from about 0.1 to about 0.2 millimeter in diameter These meshes are pressed into the face of the electrode. The meshes can be pressed into dried electrode material, which may then be sintered. More usually, the meshes are pressed into damp, freshly deposited electrode material before such material is heat treated. The pressure employed can range from a moderate pressure of on the order of about 500 psi, which will be sufficient for desirably pressing the overlayed mesh into the underlying sheet electrode face, up to elevated pressures of 1000 psi or so, or ranging up to a very elevated pressure of about 3000–4000 psi or more.

It is of particular interest in the present invention, that the electrolyte face of a gas diffusion electrode be provided with an overlay of a wettable, liquid-permeable and dimensionally-stable sheet of non-cellulosic paper. This paper can serve as a gas barrier when wetted, thereby resisting gas blow-through from the pressurized gas side of the electrode. Such paper, together with the mesh, thereby assists in providing a most durable form-stable electrode. Suitable papers include asbestos paper and other electrolyte absorbent mineral fiber papers as well as glass paper and ceramic papers. For use with the electrode, such papers should have thickness on the order of less than about 20 mils for best liquid permeability. By being dimensionally stable it is meant that the paper will be resistant to deleterious swelling or other change, e.g., substantial separation from the underlying electrode, while in contact with the electrolyte medium. Such medium, for example caustic battery electrolyte, can wet and swell cellulosic paper and will also be corrosive. Hence suitable paper needs to be corrosion resistant.

These papers can be "staked" to the electrode face by a foraminous overlay, e.g., metal mesh, during a pressing operation. Thus the Paper may be used without employing adhesives or other similar fastening means, there being needed only the mechanical pressure of the overlay compressed to the electrode. Where such papers may be temperature sensitive, e.g., subject to some degradation at temperatures approaching 250°–350° C., it is advantageous to stake the papers to the sheet electrode after the sintering operation. During the "staking" operation of the paper to the electrode substrate with the foraminous overlay, the paper may be stretched as well as staked thereby providing a most desirable close contact between paper and underlying electrode component.

The following examples show ways in which the invention has been practiced but should not be construed as limiting the invention.

EXAMPLE 1

Preparation of catalyzed carbon by direct combination

The conventional method of application of cobalt tetramethoxyphenyl porphyrin (CoTMPP) to carbon is from a solvent. But it has been found that an at least equally active catalyst can be prepared by intimately mixing carbon and CoTMPP by a milling operation, followed by heat treatment. For this, a 50 gram (gm.) sample of steam activated acetylene black (Shawinigan TM Black) was blended with 5.55 gms. of crystalline CoTMPP in a V blender (Patterson Kelly) for 15 minutes. The mixture was then comminuted by passing through a hammer mill. Subsequently the carbon-catalyst mixture was transferred to a silica tray and placed in a controlled atmosphere furnace. Nitrogen was allowed to flow through the furnace for 60° C. in minutes and then the furnace was set to reach 800° C. 120–150 minutes, held at 800° C. for two (2) hours, and then cooled to room temperature with nitrogen flowing continuously. Scanning Electron Microscopy studies show that CoTMPP is uniformly distributed on the carbon during heat treatment by this direct combination method.

EXAMPLE 2

Catalyzed carbon treated with hydrophilic polymer binder

An 87 gm. sample of hydrophilic fluorinated polymer, more particularly a perfluorosulfonate ionomer produced by E. I. du Pont de Nemours under the trademark of NAFION and having an equivalent weight of 1100, was soaked in an aqueous solution of 10 weight percent HCl at room temperature for three (3) hours. This soaking was repeated and then the polymer was rinsed in deionized water. The rinsed polymer was soaked for 17 hours in 150 gms. per liter of LiOH, washed and dried. A 40 gm. sample of the polymer was cut into small pieces, placed into a reactor with 360 gms. of sulfolane and stirred at 250° C. for 90 minutes in nitrogen atmosphere. This resulted in an apparent solution of the polymer sample.

A 10 gm. portion of the catalyzed carbon, plus 8.4 milliliters (mls.) of the above-prepared 10 percent polymer solution together with 100 mls. of acetone were then dispersed for 30 minutes in an ultrasonic bath, and dried to the consistency of a mud at room temperature. Finally, sulfolane was removed at 200° C. in a vacuum oven, during an 18-hour period. The product was then finely chopped in a coffee grinder and hammermilled to a fine powder having a particle size of less than about 5 microns.

EXAMPLE 3

A 24.7 mls. sample of hydrophilic fluorinated polymer solution (duPont NAFION 1100EW polymer having $SO_3H$ functionality, as a 5 weight percent solution in lower aliphatic alcohols and water) together with 150 mls. of isopropanol, and 10 gms. of catalyzed carbon were stirred for 30 minutes in an ultrasonic cleaning bath. The mixture was then dried with constant stirring to minimize film formation as it dried. The product was chopped and pulverized as in Example 2 to prepare an active material having a particle size of less than about 5 microns.

A gas supplying material was prepared by dispersing 70 weight parts of carbon black (Shawinigan Black) in water. To this there were added dispersions of particulate polytetrafluoroethylene (PTFE) (TEFLON TM 30 dispersion from duPont) and of particulate ethylene-propylene copolymer (FEP)(FEP-120 dispersion from duPont) sufficient to provide 10 weight parts of PTFE and 20 weight parts of FEP. The resulting dispersion was dried and heat treated at 300° C. for 20 hours to destroy the wetting agents which were originally in the fluoropolymer dispersions used. The product was then hammermilled to a fine powdered gas supplying material having a particle size of less than about 50 microns.

The two materials, the active material and the gas supplying material, can then be combined to form the active layer of a gas diffusion electrode.

EXAMPLE 4

A gas supplying layer was prepared by filtration from isopropanol on a separable filter paper. For this layer, the material used was an alcohol dispersion of the carbon black/PTFE/FEP fine powder described in Example 3. Sufficient dispersion was deposited on the filter paper to deposit 10 milligrams (mg.) (dry basis) of material solids per sq. cm. ($cm^2$) of filter substrate. A silvered nickel 50×25 mesh current collector was cold pressed in the resulting damp layer of solids, which freshly deposited layer was then dried at about 100° C. while compressed at about 500 psi. The mesh current collector was silver plated, nickel coated copper wire of about 0.12 mm. diameter with 25 individual wires per inch in one direction and 50 wires per inch in the other direction, the mesh weighing 35 milligrans/$cm^2$ (mg/$cm^2$). The filter paper was removed and the dried layer was then pressed flat at 1,000 psi while at a temperature of 110° C., thereby forming an air cathode backing layer.

A mixture of the finely powdered active material prepared as the product in Example 2, together with the gas supplying material of Example 3 was blended in isopropanol. The mixture was filtered on the above-prepared backing layer which provided a freshly deposited active layer containing 14 mg/$cm^2$ of active material and 9 mg/$cm^2$ of gas supplying material, both dry basis, in the active layer.

An open expanded nickel mesh was pressed into the face of this active layer of the electrode. The mesh is designated as 5Ni7-1/0 by the fabricator of the expanded mesh, i.e., the mesh has 5 mils thick, 7 mils wide strands and a 1/0 pattern providing 65 openings/$in^2$ of mesh.

The resulting dual phase electrode was dried and pressed at 2000 psi, vacuumed to remove isopropanol absorbates and finally sintered at 300° C. under a moderate pressure of 200 psi, completing the preparation of the electrode.

EXAMPLE 5

One square inch of an electrode prepared as indicated in Example 4, was life tested as an air cathode in a cell having a chemically inert nickel counter-electrode, a heater, stirrer, a thermostat and a D.C. power source. The nickel anode evolved oxygen at the same rate at which the air cathode consumed oxygen from a circulating air supply. The air supplied was scrubbed substantially free of $CO_2$, and flowed at four times the theoretical requirement. The cell electrolyte was a mixture of 4N KOH and 1N $KAlO_2$, and was maintained at 80° C.

An hour after wet-down, current was applied and reached 450 milliamps (ma) per $cm^2$, in steps, 4 hours after starting at 50 ma/$cm^2$. At 450 ma/$cm^2$, the cathode voltage was initially 0.53 volt, measured against the reversible hydrogen electrode, and improved to 0.77 volt within 3 hours. Current was then maintained at 450 ma/$cm^2$ for the duration of the test. Voltage slowly declined to 0.54 volt over the next 134 days, at which point the test was discontinued.

In addition to attaining a lifetime not previously achieved, a notable feature of the start-up was the speed with which the electrode reached a satisfactory working voltage at the high current density tested.

EXAMPLE 6

Another electrode was prepared identically to the electrode of Example 5 with the exceptions that the hydrophilic fluorinated polymer used in the active material binder was in the hydrogen form rather than the lithium salt form, and was used at a higher level, i.e., 30 percent, as opposed to the 10 percent, as shown in Example 2. When the electrode was tested as an air cathode in a similar manner as in Example 5, a two-month life was achieved.

Still another electrode, prepared as above-described and using 30 percent of the hydrogen form of the hydrophilic fluorinated polymer binder was tested. The electrode operated for 115 days at 450 ma/$cm^2$ as an air cathode before electrode failure.

Samples of electrode active layers made similarly to those above described were then subjected to tensile strength testing. This test was conducted by preparing a sintered dual phase active layer, without metal mesh or expanded metal, in the shape of a test specimen and pull testing it in the plane of the layer. For this test, the electrodes used were each of ½ mm. thickness. As shown in the table below, samples for each composition were tested after sintering at different temperatures, while under 200 psi compression.

For each test sample, the active layer constituted 60 weight percent active material and 40 weight percent gas supplying material. Results are reported in the table below.

TABLE

| Weight Percent NAFION 1100EW In Layer Active Material | Tensile Strength, psi At Indicated Sinter Temperatures | |
|---|---|---|
| | 250–265° C. | 285–300° C. |
| 10% | 0 | 0 |
| 30% | 31 | 43 |
| 40% | 45 | 53 |

Additionally, the gas supplying material, only, was made in to a layer of about 2/3 mm. thickness and sintered at the two temperatures indicated. The tensile strength for the material was 34 and 36 psi, respectively, at the lower and higher sintering temperatures, indicating that the strength of the layer was controlled by the weaker component of the two.

EXAMPLE 7

For protecting an electrode with a gas barrier paper, an electrode of bilayer construction was selected. The paper was 5 mil thick Ce Quin binder-containing ceramic paper, manufactured by Quin T Corporation. The paper layer was juxtaposed to the face of the active layer of the electrode before adding the face mesh. The mesh used was the 5Ni7-1/0, mesh described in Example 4, which was then flattened and placed atop the ceramic paper and pressed at a very elevated pressure of 3,000 psi to embed the mesh and paper in the electrode face. After pressing, it could be determined by visual inspection that this procedure not only staked the paper to the electrode at the line of contact, but also stretched it as well, bringing it to close proximity to the underlying electrode.

We claim:

1. An electrode capable of extended performance at high current density, said electrode comprising a gas porous, gas supplying layer containing hydrophobic polymer, and an electrolyte porous active layer comprising catalyst containing carbon particles intimately blended with, and uniformly distributed throughout, hydrophilic halogenated polymer binder for said catalyzed carbon particles, which intimate blend is combined in said active layer with particulate substance bound with hydrophobic polymer.

2. The electrode of claim 1, wherein said electrode is an oxygen reduction cathode.

3. The electrode of claim 1, wherein said active layer intimate blend contains from about 10 to about 65 weight percent of said hydrophilic halogenated polymer and a balance of said catalytically active carbon particles.

4. The electrode of claim 1, wherein said hydrophilic, halogenated polymer is derived at least in part from fluorinated ionomer.

5. The electrode of claim 1, wherein said active layer, is a particulate blend of particles having size within the range from about 1 to about 25 microns.

6. The electrode of claim 1, wherein particulate hydrophobic substance is bound with said hydrophobic polymer.

7. The electrode of claim 1, wherein there is present in said active layer at least about 1.5 weight parts of said intimate blend of catalyzed carbon particles plus hydrophilic polymer per one weight part of particulate substance bound with hydrophobic polymer.

8. The electrode of claim 1, wherein said gas supplying layer consists essentially of hydrophobic polymer.

9. The electrode of claim 1, wherein said hydrophobic polymer comprises hydrophobic fluoropolymer.

10. The electrode of claim 1, wherein said hydrophobic polymer serves as binder for finely-divided particles and said gas supplying layer contains from about 40 to about 80 weight percent of said particles.

11. The electrode of claim 1, wherein said gas supplying and active layers are in adherent, face-to-face contact.

12. The electrode of claim 1, wherein said carbon particles contain catalyst comprising one or more of a platinum group metal catalyst, a platinum group metal oxide catalyst, other metal oxide catalyst, or the residue remaining upon heating a macrocyclic compound catalyst.

13. The electrode of claim 1, wherein a foraminous overlay contacts a face of at least one layer.

14. A metal-air battery containing an oxygen cathode as defined in claim 1.

15. A catalytically-active particulate product of blended ingredients adapted for preparing an electrode capable of extended operation at high current density, said particulate product comprising hydrophobic ingredient containing hydrophobic polymer combined with finely-divided particulate substance, which hydrophobic ingredient particles are in mixture with hydrophilic ingredient particles comprising an intimate blend of catalyst containing carbon particles plus hydrophilic halogenated polymer binder 16. The particulate product of claim 15, wherein said intimate blend of catalyst containing carbon particles plus hydrophilic halogenated polymer is a particulate blend having particle size within the range from about 1 to about 25 microns.

17. The particulate product of claim 15, wherein said hydrophilic ingredient particles contain from about 10 to about 65 weight percent of said hydrophilic halogenated polymer and a balance of said catalytically active carbon particles.

18. The particulate product of claim 15, wherein said hydrophilic halogenated polymer is derived at least in part from a perfluorinated ionomer.

19. The particulate product of claim 15, wherein said hydrophobic polymer contains hydrophobic fluoropolymer.

20. The particulate product of claim 21, wherein said hydrophobic ingredient particles contain from about 40 to about 80 weight percent of said particulate substance.

21. The particulate product of claim 15, wherein said hydrophobic ingredient particles are in finely-divided form having a particle size within the range of from about one to about 50 microns.

22. The particulate product of claim 15, wherein there is present at least about 1.5 weight parts of said hydrophilic ingredient particles per one weight part of said hydrophobic ingredient particles.

23. The particulate product of claim 15, wherein said catalytically active carbon particles contain catalyst comprising one or more of a platinum group metal catalyst, platinum group metal oxide catalyst, other metal oxide catalyst, or the residue remaining upon heating a macrocyclic compound catalyst.

24. A metal-air battery containing an oxygen cathode having an active layer prepared from the particulate product of claim 15.

25. An electrode capable of extended performance at high current density, said electrode having an electrolyte porous active layer comprising particulate substance bound with hydrophobic polymer, and catalyzed carbon particles intimately blended with, and uniformly distributed throughout, hydrophilic halogenated polymer binder.

26. The electrode of claim 25, wherein said electrode is an oxygen cathode.

27. The electrode of claim 25, wherein particulate substance is bound with said hydrophobic polymer.

28. The electrode of claim 25, wherein about 40 to about 80 weight percent of said particulate substance is bound with about 20 to about 60 weight percent of said hydrophobic polymer.

29. The electrode of claim 25, wherein said hydrophobic polymer comprises hydrophobic fluoropolymer.

30. The electrode of claim 25, wherein said intimate blend of catalyst containing carbon particles plus hydrophilic, halogenated polymer is a particulate blend having particle size within the range from about 1 to about 25 microns.

31. The electrode of claim 25, wherein said intimate blend contains from about 10 to about 65 weight percent of said hydrophilic halogenated polymer and a balance of said catalytically active carbon particles.

32. The electrode of claim 25, wherein said hydrophilic, halogenated polymer is derived at least in part from fluorinated ionomer.

33. The electrode of claim 25, wherein said carbon particles are catalyzed with one or more of a platinum group metal catalyst, platinum group metal oxide catalyst, other metal oxide catalyst, or the residue remaining upon heating a macrocyclic compound catalyst.

34. The electrode of claim 25, wherein said porous active layer is in sheet electrode form and a foraminous overlay contacts a face of said layer.

35. A metal-air battery containing an oxygen cathode as defined in claim 25.

36. In a sheet electrode having a hydrophilic, catalytically active electrolyte side and a hydrophobic gas side containing hydrophobic polymer, the improvement in said sheet electrode comprising a thin sheet of porous, electrolyte wettable and permeable, dimensionally stable non-cellulosic paper pressed over and against at least a portion of said electrolyte side, with said paper being pressed under a foraminous overlay for said paper.

37. The sheet electrode of claim 36, wherein said electrolyte side comprises an intimate sintered mixture of hydrophilic, halogenated polymer binding catalyzed carbon particles.

38. The sheet electrode of claim 36, wherein said paper has a thickness not in excess of about 20 mils.

39. The sheet electrode of claim 36, wherein said paper comprises one or more of asbestos paper, ceramic paper or glass paper.

40. The sheet electrode of claim 36, wherein said foraminous overlay comprises a metal mesh.

41. A gas diffusing electrode comprising:
(a) a first foraminous overlay compressed against a broad face of a hydrophobic gas side layer for said electrode;
(b) a hydrophobic gas side comprising a layer containing hydrophobic polymer, with said foraminous overlay being pressed against a broad face of said hydrophobic gas side layer;
(c) a hydrophilic electrolyte side comprising a layer of catalyzed carbon particles bound with hydrophilic, halogenated polymer binder, with said hydrophilic electrolyte side layer being in intimate contact against said hydrophobic gas side layer;

(d) a second foraminous overlay compressed against a broad face of said hydrophilic electrolyte side layer; and (e) porous, electrolyte wettable and permeable, dimensionally stable non-cellulosic paper pressed against a broad face of one or more of said electrolyte or gas side layers and pressed under said foraminous overlay.

42. The electrode of claim 41, wherein said first and second foraminous overlays are metal meshes.

43. The electrode of claim 41, wherein said non-cellulosic paper is compressed under a metal mesh against a broad face of said hydrophilic electrolyte side layer.

44. The electrode of claim 44, wherein said non-cellulosic paper is maintained in place by only the mechanical compression of said foraminous overlay.

45. The electrode of claim 41, wherein said paper comprises one or more of asbestos paper, ceramic paper or glass paper.

46. A gas diffusion electrode comprising:
(a) a sheet electrode comprising hydrophobic polymer in mixture with catalyst-containing carbon particles which are intimately blended with, and uniformly distributed throughout, halogenated hydrophilic polymer binder for said catalyzed carbon particles;

(b) a first foraminous overlay compressed against a broad face of a gas side layer for said sheet electrode;

(c) a second foraminous overlay compressed against a broad face of an electrolyte side layer for said sheet electrode; and (d) porous, electrolyte wettable and permeable dimensionally stable non-cellulosic paper pressed against said broad face of said electrolyte side under said foraminous overlay.

47. The electrode of claim 46, wherein said first and second foraminous overlays are metal meshes.

48. The electrode of claim 46, wherein said non-cellulosic paper is maintained in place by only the mechanical compression of said foraminous overlay.

49. The electrode of claim 46, wherein said paper comprises one or more of asbestos paper, ceramic paper or glass paper.

* * * * *

UNITED STATES PATENT AND TRADEMARK OFFICE
CERTIFICATE OF CORRECTION

PATENT NO. : 4,877,694

DATED : October 31, 1989

INVENTOR(S) : Solomon et al.

It is certified that error appears in the above-identified patent and that said Letters Patent is hereby corrected as shown below:

On the cover page:

Section [75] Inventors:, delete "Yury Genodman, Brooklyn, both of"

Column 12, line 54, after "layer" insert --intimate blend prior to preparation of said active layer--.

Signed and Sealed this

Twenty-sixth Day of November, 1991

Attest:

HARRY F. MANBECK, JR.

Attesting Officer

Commissioner of Patents and Trademarks